(12) United States Patent
Kogetsu et al.

(10) Patent No.: US 8,080,334 B2
(45) Date of Patent: *Dec. 20, 2011

(54) LITHIUM SECONDARY BATTERY

(75) Inventors: Yasutaka Kogetsu, Suita (JP); Masaya Ugaji, Suita (JP); Keiichi Takahashi, Nishinomiya (JP); Shinji Mino, Ibaraki (JP); Nobuaki Nagao, Ohgaki (JP); Satoshi Shibutani, Hirakata (JP); Kazuyoshi Honda, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1285 days.

This patent is subject to a terminal disclaimer.

(21) Appl. No.: 11/363,945

(22) Filed: Mar. 1, 2006

(65) Prior Publication Data

US 2007/0031733 A1 Feb. 8, 2007

(30) Foreign Application Priority Data

Aug. 2, 2005 (JP) .................................. 2005-223586

(51) Int. Cl.
*H01M 10/40* (2006.01)
*H01M 4/20* (2006.01)
*H01M 4/48* (2010.01)

(52) U.S. Cl. ............... 429/218.1; 429/220; 429/223; 429/231.95; 429/233

(58) Field of Classification Search .................. None
See application file for complete search history.

(56) References Cited

U.S. PATENT DOCUMENTS

| | | | |
|---|---|---|---|
| 5,494,762 A | 2/1996 | Isoyama et al. | |
| 5,866,204 A | 2/1999 | Robbie et al. | |
| 6,248,422 B1 | 6/2001 | Robbie et al. | |
| 6,649,033 B2 | 11/2003 | Yagi et al. | |
| 6,800,400 B2 | 10/2004 | Ota et al. | |
| 6,887,623 B2 | 5/2005 | Fujimoto et al. | |
| 7,192,673 B1 | 3/2007 | Ikeda et al. | |
| 7,195,842 B1 | 3/2007 | Fujimoto et al. | |
| 7,235,330 B1 | 6/2007 | Fujimoto et al. | |
| 7,241,533 B1 | 7/2007 | Ikeda et al. | |
| 7,816,032 B2 | 10/2010 | Honda et al. | |
| 2004/0241548 A1 | 12/2004 | Nakamoto et al. | |
| 2005/0048369 A1 | 3/2005 | Koshina et al. | |

(Continued)

FOREIGN PATENT DOCUMENTS

EP 1 231 653 A1 8/2002

(Continued)

OTHER PUBLICATIONS

English translation of Korean Notice for Ground of Rejection issued in Korean Patent Application No. KR 10-2008-7009704 dated Dec. 23, 2008.

(Continued)

*Primary Examiner* — John S Maples
(74) *Attorney, Agent, or Firm* — McDermott Will & Emery LLP

(57) ABSTRACT

In order to enhance charge and discharge efficiency and to improve cycle characteristics by increasing a facing area between a positive electrode active material and a negative electrode active material, in a negative electrode for lithium secondary battery having a current collector and an active material layer carried on the current collector, the active material layer includes a plurality of columnar particles. The columnar particles include an element of silicon, and are tilted toward the normal direction of the current collector. Angle θ formed between the columnar particles and the normal direction of the current collector is preferably $10°≦θ<90°$.

13 Claims, 4 Drawing Sheets

U.S. PATENT DOCUMENTS

| | | | |
|---|---|---|---|
| 2005/0095506 A1 | 5/2005 | Klaassen | |
| 2005/0100790 A1* | 5/2005 | Ota et al. | 429/231.95 |
| 2005/0153208 A1 | 7/2005 | Konishiike et al. | |
| 2006/0024586 A1 | 2/2006 | Tamura et al. | |
| 2007/0059601 A1 | 3/2007 | Natsume et al. | |
| 2007/0207386 A1* | 9/2007 | Konishiike et al. | 429/232 |

FOREIGN PATENT DOCUMENTS

| | | |
|---|---|---|
| EP | 1 231 654 A1 | 8/2002 |
| EP | 1 246 278 A1 | 10/2002 |
| EP | 1 912 270 A | 4/2008 |
| JP | 05-249299 | 9/1993 |
| JP | 06-187994 | 7/1994 |
| JP | 06-290782 | 10/1994 |
| JP | 9-213366 | 8/1997 |
| JP | 2001-502013 | 2/2001 |
| JP | 2002-170482 | 6/2002 |
| JP | 2002-170557 | 6/2002 |
| JP | 2003-17040 | 1/2003 |
| JP | 2003-077463 | 3/2003 |
| JP | 2003-187806 | 7/2003 |
| JP | 2003-303586 | 10/2003 |
| JP | 2004-031217 | 1/2004 |
| JP | 2004-127561 | 4/2004 |
| JP | 2004-296103 | 10/2004 |
| JP | 2004-319469 | 11/2004 |
| JP | 2005-11725 | 1/2005 |
| JP | 2005-100959 | 4/2005 |
| JP | 2005-108523 | 4/2005 |
| JP | 2005-141992 | 6/2005 |
| JP | 2005-196970 | 7/2005 |
| JP | 2005-235397 | 9/2005 |
| JP | 2006-172973 | 6/2006 |
| JP | 2006-196447 | 7/2006 |
| KR | 10-2005-021892 | 7/2005 |
| RU | 2099819 C1 | 12/1997 |
| WO | WO 2004/049476 A1 | 6/2004 |
| WO | WO 2004/109839 A1 | 12/2004 |
| WO | WO 2005/008809 A1 | 1/2005 |
| WO | WO 2007/015419 A | 2/2007 |

OTHER PUBLICATIONS

Shiraki, Y. et al., "Morphological Control of Thin Film," pp. 287-290 and pp. 298-299 with partial English translation thereof.

Robbie K., et al., "Sculptured then films and glancing angle deposition: Growth mechanics and applications," Journal of Vacuum Science and Technology, A 15(3), May/Jun. 1997, p. 1460-01465.

Suzuki M., et al., "Integrated Sculptured Thin Films," Jpn. J. Appl. Phys. vol. 40 (2001) pp. L 358-L 359, Part 2, No. 4A, Apr. 1, 2001.

Messier R. et al., "Engineered sculptured nematic thin films," Journal of Vacuum Science and Technology, A 15(4), Jul./Aug. 1997, p. 2148-2151.

European Search Report issued in European Patent Application No. EP 06823060.6-2119 dated Mar. 4, 2009.

Robbie K., et al., "Advanced techniques for glancing angle deposition," Journal of Vacuum Science & TechnologyB: Microelectronics processing and Phenomena, American vacuum Society, New York, NY, vol. 16, No. 3, May 1, 1998, pp. 1115-1122.

International Search Report (with English translation) Issued in International Application No. PCT/JP2006/314879 dated Oct. 24, 2006.

European Search Report issued in European Patent Application No. EP 06 78 1790, mailed Jul. 2, 2008.

Nieuwenhuizen, J.M., et al., "Microfractography of thin films", Philips Technical Review, 1966, pp. 87-91, vol. 27.

M. Molinari et al., "Visible photoluminescence in amorphous $SiN_x$ thin films prepared by reactive evaporation," Applied Physics Letter, vol. 77, No. 22, 2000, pp. 3499-3501.

"Formation of $SiN_x$ film by ion-beam-assisted vapor deposition," Iwase, Kobayashi, Masaki, Morisaki, Proceedong of the School of Engineering of Tokai University, vol. 31, No. 1, 1991, pp. 23-30.

K. C. Mohite et al., "Characterization of silicon oxynitride thin films deposited by electron beam physical vapor deposition technique," Material Letters, vol. 57, 2003, pp. 4170-4175.

United States Office Action issued in U.S. Appl. No. 11/886,848 dated Nov. 19, 2010.

* cited by examiner

LITHIUM SECONDARY BATTERY

This application claims priority from Japanese No. 2005-223586, filed 2 Aug. 2005.

BACKGROUND OF THE INVENTION

The present invention relates to a negative electrode for lithium secondary battery, the negative electrode comprising a current collector and an active material layer carried on the current collector, the active material layer comprising particles grown like columns (columnar particles), and the columnar particles including silicon as a constituent element.

With the development of portable devices such as a mobile phone and a personal computer in these days, a demand for a battery as a power source for such devices is increasing. In a battery for such devices, the usage at ordinary temperatures is demanded, as well as a high energy density and excellent cycle characteristics.

For such demands, a new active material with a higher capacity has been developed for a positive electrode and for a negative electrode, respectively. Among these newly developed active materials, the simple substance, an oxide, or an alloy of silicon (Si) or tin (Sn), which enables a far higher capacity, has been expected as a potential negative electrode active material.

The problem in using silicon as a negative electrode active material is deformations of the negative electrode. When charging and discharging, the negative electrode active material greatly expands and contracts by absorption and desorption of lithium (Li), to greatly deform or distort the negative electrode, and to cause an undulation or winding (wrinkling). Thus, a gap is created between the negative electrode and a separator, causing non-homogeneous charge and discharge reactions, leaving a concern for a decline in cycle characteristic.

For such problems, there has been proposed to suppress the decline in cycle characteristics by providing a space to alleviate the stress from the expansion of the active material in the negative electrode to avoid deformation and winding. For example, Japanese Laid-Open Patent Publication No. 2003-303586 proposes to form columnar particles of silicon on the current collector. Japanese Laid-Open Patent Publication No. 2004-127561 proposes the pattern formation in which an active material capable of forming an alloy with lithium is regularly aligned on the current collector.

In both Japanese Laid-Open Patent Publication No. 2003-303586 and Japanese Laid-Open Patent Publication No. 2004-127561, a negative electrode active material is formed as a columnar structure standing upright along the normal direction of the sheet-like current collector. Thus, a part of the positive electrode active material faces the exposed surface of the negative electrode current collector, not facing the negative electrode active material. Therefore, lithium supplied from the positive electrode active material at the time of charging tends to deposit on the exposed part of the negative electrode current collector, without being absorbed by the negative electrode active material. As a result, lithium cannot be released from the negative electrode effectively at the time of discharging, thereby declining charge and discharge efficiency.

Additionally, at the time of discharging, only the positive electrode active material facing the negative electrode active material is more likely to react. This may cause a partial over-discharge in the positive electrode active material, while declining substantial discharge capacity. When the repetitive charge and discharge cycle further advances the non-homogeneous reactions, the positive electrode active material that could not be discharged will easily be in the over-charged state, while increasing the positive electrode active material under the over-discharged state. Thus, side reaction increases, discharge capacity decreases, and deterioration of battery advances. Especially, when a high-rate charge and discharge is carried out at a large current value, cycle characteristics decline drastically.

BRIEF SUMMARY OF THE INVENTION

The present invention relates to a negative electrode for lithium secondary battery including a sheet-like current collector and an active material layer carried on the current collector:

the active material layer comprising a plurality of columnar particles;

the columnar particles comprising an element of silicon; and the columnar particles being obliqued (tilted) toward the normal direction of the current collector.

The present invention also relates to a lithium secondary battery, comprising a positive electrode capable of absorbing and desorbing lithium ion, the above negative electrode, a separator disposed between the positive electrode and the negative electrode, and an electrolyte having lithium ion conductivity.

An angle $\theta$ formed between the columnar particles and the normal direction of the current collector is preferably 10° or more and less than 90° ($10° \leq \theta < 90°$). The angle $\theta$ formed between the columnar particles and the normal direction of the current collector is preferably obtained as an average of the values measured for 2 to 10 columnar particles, for example.

Herein, the normal direction of the current collector refers to the direction perpendicular to the main flat surface of the current collector, and the angle formed between the columnar particles and the normal direction of the current collector refers to the angle between the growth direction (in other words, longitudinal direction) of the columnar particles and the normal direction of the current collector. The main flat surface of the current collector preferably is flat when observed visually but uneven when observed microscopically. When the columnar particles are to be grown by a vapor-deposition, for example, the growth direction of the columnar particles is determined by the tilt angle of the columnar particles relative to the horizontal plane of the vapor-deposition surface of the current collector. At the time of vapor-deposition, a target is placed at the lower side in the vertical direction relative to the current collector, for example.

The columnar particle may be in the form of a substantially cylindrical column having a substantially circular cross section or a substantially prism having a substantially rectangular cross section, for example, but does not have to be in the form of precisely cylindrical column or prism. The diameter (thicknesses) of the columnar particle may be varied in its longitudinal direction. In other words, the columnar particle may have a different diameter (thicknesses) in its longitudinal direction. Further, one end of the columnar particle (one end corresponding to one basal plane of a column) is bound to the surface of the current collector.

An area A of a portion in the current collector where the active material layer is carried, and an area B of an ortho graphic projection of the active material layer seen from the normal direction preferably satisfy the relation:

$$\frac{A-B}{A} \times 100 \leq 60,$$

further preferably satisfy the relation:

$$\frac{A-B}{A} \times 100 \leq 30,$$

and particularly preferably satisfy the relation:

$$\frac{A-B}{A} \times 100 \leq 0.$$

Hereinafter, the ratio $$\frac{A-B}{A} \times 100 (\%)$$

is referred to as exposure ratios of the current collector. The exposure ratio S of the current collector represents the size of the observable exposed area of the current collector, when the active material layer is observed from the normal direction of the current collector. Thus, a smaller exposure ratio S of the current collector is preferable in that the non-homogeneous electrode reaction is suppressed.

The center-to-center distance (i.e. pitch) of the columnar particles adjacent to each other is preferably 0.1 μm or more and 200 μm or less, for example, at the mid-height of the columnar particles adjacent to each other. The center-to-center distance can be measured in a cross section of the active material layer parallel to the columnar particles.

Herein, the cross section parallel to the columnar particles refers to the cross section obtained by cutting the current collector and active material layer simultaneously parallel to the growth direction of the columnar particles. The center-to-center distance of the columnar particles adjacent to each other is obtained, for example, by selecting 2 to 10 pairs of columnar particles adjacent to each other at the obtained cross section, measuring the center-to-center distance at the mid-height of these pairs of columnar particles, and then calculating the average value of the obtained distances. The center-to-center distance of the columnar particles at the mid-height is measured in the direction parallel to both of the cross section and the main flat surface of the current collector. When the heights of the columnar particles adjacent to each other are different, the half of the average height of these columnar particles is set as the mid-height.

The porosity P of the active material layer is preferably 10% or more and 70% or less (10%≦P≦70%).

The porosity P can be measured by using a mercury porosimeter, for example. In the measurement using the mercury porosimeter, mercury goes into the gaps in the negative electrode. At that time, the porosity P (%) is calculated by 100×{the volume of mercury entered in the gaps/(true volume of the active material layer+the volume of mercury entered in the gaps)}. The true volume of the active material layer can be calculated from the weight of the active material layer and the specific gravity of the columnar particles. The measuring method for the porosity P is not limited to the method using the mercury porosimeter. The porosity P can be calculated as well from the weight and thickness of a certain area of the active material layer, and the density of the active material, for example.

The active material layer comprises at least one component selected from the group consisting of the simple substance of silicon, a silicon alloy, a compound including silicon and oxygen, and a compound including silicon and nitrogen, for example. One of these components can be used alone to form the active material layer, or a plurality of these components can be used simultaneously in combination to form the active material layer. Examples of the active material layer formed from a plurality of the above components include: an active material layer comprising a compound including silicon, oxygen, and nitrogen; and an active material layer comprising a composite compound of a plurality of compounds including silicon and oxygen with different ratio of silicon and oxygen.

A metal element M included in the silicon alloy in addition to silicon is preferably a metal element that does not form an alloy with lithium, in other words, a metal incapable of forming an alloy with lithium. The metal element M is preferably at least one selected from the group consisting of titanium, copper, and nickel, for example. One kind of the metal element M may be included in the silicon alloy, or a plurality of kinds of the metal element M may be included in the silicon alloy at the same time.

The compound including silicon and oxygen preferably has a composition represented by the general formula (1): $SiO_x$, where $0<x<2$. Also, the compound including silicon and nitrogen preferably has a composition represented by the general formula (2): $SiN_y$, where $0<y<4/3$.

The surface of the current collector (i.e. main flat surface) preferably has a surface roughness (ten point height of roughness profile) Rz of 0.1 to 100 μm. The surface roughness Rz can be measured by the method specified by Japan Industrial Standard (JIS). For such a current collector, an electrolyte copper foil, an electrolyte copper alloy foil, a further roughened electrolyte copper foil, and a roughened-rolled copper foil can be preferably used, for example. The roughening refers to the process in which a copper foil is soaked in a solvent for a partial chemical etching to give uneven surface, or to the process in which copper particles are electrodeposited onto the copper foil to give uneven surface.

A thickness t of the active material layer is preferably 0.1 μm or more and 100 μm or less (0.1 μm≦t≦100 μm).

Herein, the thickness t of the active material layer may be obtained by an average of the heights of the columnar particles in the normal direction of the current collector. The thickness t of the active material layer may be obtained by selecting 2 to 10 columns of the columnar particles at an arbitrary cross section obtained by cutting the current collector and the active material layer simultaneously, and then calculating the average of the heights of these selected columns at the normal direction of the current collector.

The diameter of the columnar particles is not limited particularly. But in view of preventing the cracks and separations of the columnar particles from the copper foil due to the expansion at the time of charging, the diameter is preferably 100 μm or less, and particularly preferably 1 to 50 μm, in one of the cases where the active material includes lithium corresponding to irreversible capacity and the case where the active material does not include lithium at all. The diameter of the columnar particles may be obtained by selecting arbitrary 2 to 10 columns of columnar particles, measuring the diameters (the diameter perpendicular to the growth direction) of these columns at the mid-height, and then calculating the average, for example.

A plurality of the columnar particles adjacent to each other sometimes join together during their growth processes. However, since each of the columnar particles has a different starting point of the growth, the columnar particles are separated from each other in the vicinity of the current collector surface, having different state of crystal growth. Thus, since a boundary can be observed between the columnar particles joined together, the diameter of each columnar particle can be obtained.

All of the parameters showing the center-to-center distance (pitch) of adjacent the columnar particles, the thickness of the active material layer, the porosity P, and the diameter of columnar particles are preferably measured under the condition where the negative electrode active material includes lithium corresponding to the irreversible capacity, or under the condition where the negative electrode active material includes no lithium at all. In other words, these parameters are preferably measured by using a negative electrode not including lithium corresponding to reversible capacity (in the state where reversible capacity equals 0).

Especially in the case where the porosity is measured by the mercury porosimeter, the porosity P is preferably measured under the condition where the active material does not include lithium at all. In this case, if the value of the porosity P is corrected by using the volume difference of the case where lithium corresponding to irreversible capacity is included and the case where lithium is not included at all, a porosity P' under the condition where the negative electrode active material includes lithium corresponding to irreversible capacity can be obtained as well.

According to the present invention, since the columnar particles forming the negative electrode active material layer are tilted toward the normal direction of the current collector, seeing from the positive electrode side, the exposed part of the negative electrode current collector drastically decreases. Thus, the area where the positive electrode active material and the negative electrode active material are facing becomes large, to cause homogeneous electrode reaction, enhance charge and discharge efficiency, and improve cycle characteristics.

Additionally, when lithium corresponding to irreversible capacity is supplemented to the negative electrode before forming a battery, residual lithium on the current collector will decrease due to the extremely smaller degree of negative electrode current collector exposure. Thus, while material losses are decreased, side reactions of electrolyte can be suppressed, which enables sustainable, excellent battery performance for a longer period of time. The supplement of lithium corresponding to irreversible capacity can be carried out by attaching lithium metal to the negative electrode, or by vapor-depositing lithium metal on the negative electrode.

The tilting of the columnar particles toward the normal direction of the current collector is also advantageous for high-rate charge and discharge, since the contact area between the negative electrode active material and the electrolyte will increase.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention is described by referring to FIGs. in the following. However, the present invention is not limited to the contents below, as long as the characteristics recited in the claims are included.

Figure 1:
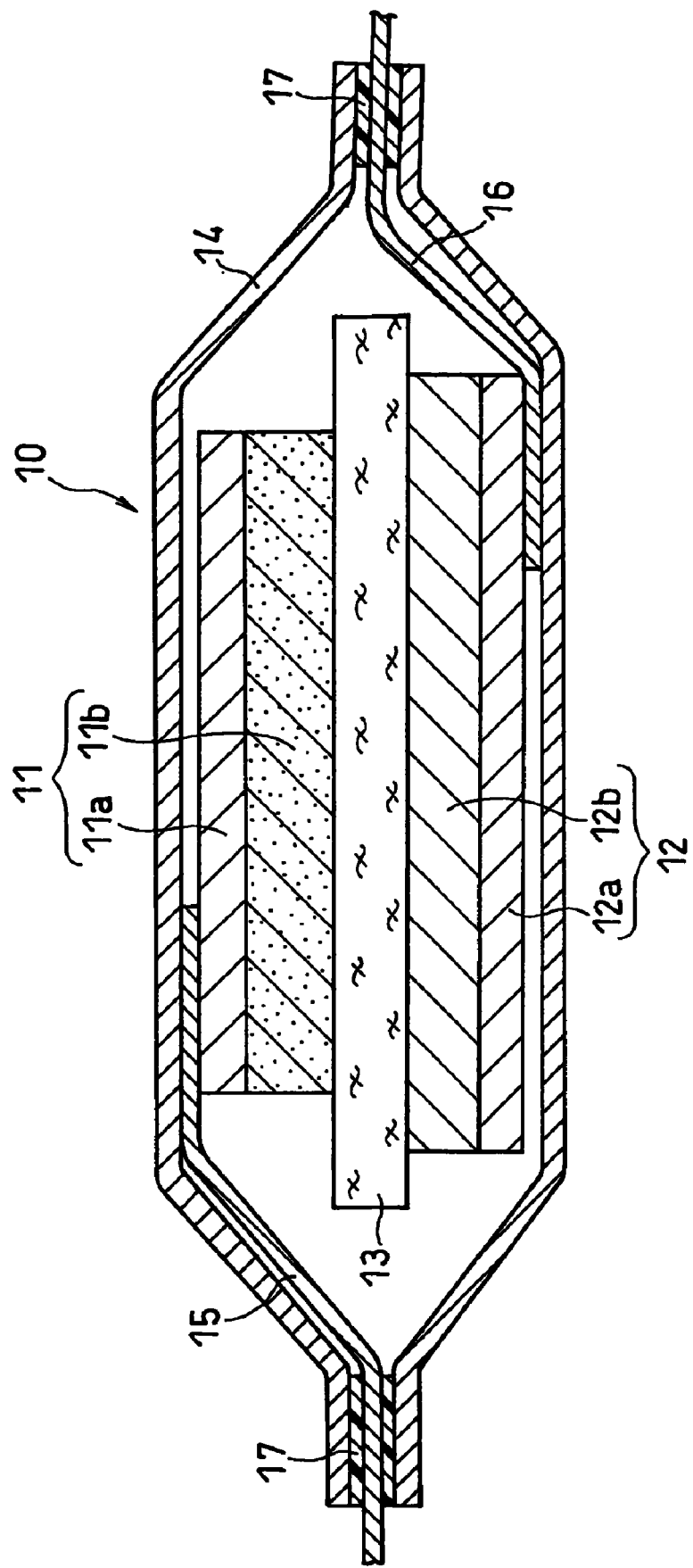
FIG. 1 is a vertical cross section of an example of a laminated lithium secondary battery.

FIG. 1 is a schematic cross section of a laminated lithium secondary battery.

A battery 10 has an electrode plate assembly comprising a positive electrode 11, a negative electrode 12, and a separator 13 interposed between these electrodes. The electrode plate assembly and an electrolyte having lithium ion conductivity are accommodated in an outer case 14. The separator 13 is impregnated with the electrolyte having lithium ion conductivity. The positive electrode 11 comprises a positive electrode current collector 11a, a positive electrode active material layer 11b carried on the positive electrode current collector 11a, and the negative electrode 12 comprises a negative electrode current collector 12a and a negative electrode active material layer 12b carried on the negative electrode current collector 12a. One end of a positive electrode lead 15 is connected to the positive electrode current collector 11a, and one end of a negative electrode lead 16 is connected to the negative electrode current collector 12a, respectively. The other ends of the positive electrode lead 15 and the negative electrode lead 16 are drawn out to the outside of the outer case 14. Openings of the outer case 14 are sealed by a resin material 17.

The positive electrode active material layer 11b desorbs lithium at the time of charging, and absorbs lithium desorbed by the negative electrode active material layer 12b at the time of discharging. The negative electrode active material layer 12b absorbs lithium, which is desorbed by the positive electrode active material at the time of charging, and desorbs lithium at the time of discharging.

Figure 2:
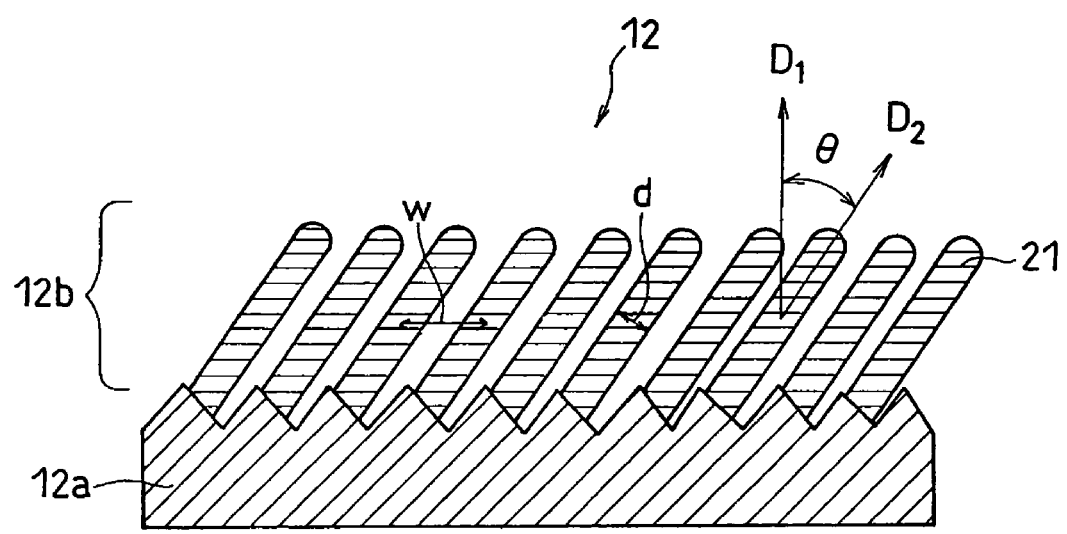
FIG. 2 is a schematic vertical cross section illustrating a structure of a negative electrode for lithium secondary battery of the present invention.

FIG. 2 is a vertical cross section schematically illustrating a structure of a negative electrode 12. The negative electrode current collector 12a has uneven surface, with some concavities and convexities, for example. The negative electrode active material layer 12b comprises a plurality of columnar particles 21, and the columnar particles 21 are grown obliquely relative to a normal direction D1 of the current collector 12a. The normal direction D1 of the current collector 12a forms an angle θ with a growth direction D2 of the columnar particles 21. The columnar particles 21 may be particles composed of single crystal, polycrystal particles including a plurality of crystallites (crystal grain), particles comprising microcrystal with the crystallite size of 100 nm or less, or amorphous.

Even in the case where a plurality of columnar particles adjacent to each other join together in the growth process, each of the columnar particles has different starting point of growth. Thus, the number of the columnar particles can be considered as the number of the starting point of growth.

Although an example of a laminated battery is shown in FIG. 1, the negative electrode for lithium secondary battery of the present invention can be surely applied to a cylindrical battery with a spiral electrode plate assembly, or a rectangular battery. Additionally, in the laminated battery, a positive electrode having a positive electrode active material layer on one side or both sides thereof, and a negative electrode having a negative electrode active material layer on one side or both sides thereof may be laminated to give 3 or more layers, so that all positive electrode active material layers face the negative electrode active material layer, and that all negative electrode active material layer face the positive electrode active material layer. Also, the tilting direction of the columnar particles on each of the negative electrode active material layer may be the same or different. Further, the columnar particles having different tilting directions may be formed within the same negative electrode, to the extent that does not cause damage to the effects of the present invention. Additionally, in the case of the negative electrode having the negative electrode active material layer on both sides thereof, the tilting direction of the columnar particles on both sides may be the same or different.

By tilting the columnar particles 21 to form an angle θ with the normal direction D1 of the current collector 12a, the exposure ratio of the negative electrode current collector 12a seen from the positive electrode active material layer 11a will decrease or will become zero, thereby improving charging and discharging efficiency, and decreasing the possibility for lithium to deposit on the negative electrode current collector. That is, non-homogeneous electrode reaction is suppressed, and charge and discharge cycle characteristics will improve. Especially, a sharp sudden drop in cycle characteristics which can be observed in high-rate charging and discharging by a large current can be remarkably suppressed.

Although an angle θ formed between the columnar particles 21 and the normal direction D1 of the current collector 12a may be 0 or more (0<θ), in order to sufficiently obtain the effects of the present invention, the angle θ is preferably 10° or more and less than 90° (10°≦θ<90°), for example. As the angle θ approaches 90°, it gradually becomes difficult to carry the columnar particles on the current collector. Additionally, in the columnar particles, when the area of a columnar particle covered by other columnar particle increases excessively, the effect to suppress the deterioration of high-rate characteristics sometimes declines. Therefore, the angle θ is preferably 10° or more and 80° or less (10°≦θ≦80°).

The exposure ratio S of the current collector obtained by the formula:

$$\frac{A-B}{A} \times 100$$

is preferably 60% or less, further preferably 30% or less, and most preferably 0%. The larger the area of the orthographic projection of the active material layer from the normal direction of the current collector, the larger the negative electrode active material facing the positive electrode active material layer and the smaller the area of the negative electrode current collector exposed relative to the positive electrode. When the center-to-center distance w of the adjacent columnar particles increases, the orthographic projection area of the active material layer decreases, but in comparison with the case where the columnar particles stand parallel to the normal direction of the current collector, the orthographic projection area becomes large relatively, which improves charge and discharge efficiency relatively.

The center-to-center distance w of the adjacent columnar particles is preferably 0.1 μm or more and 200 μm or less, or further preferably 1 to 20 μm at the mid-height of these columnar particles, for example. Although it may depend on the diameter d of the columnar particles, when the center-to-center distance w is 0.1 μm or more, the effect to ease the expansion of the columnar particles can be obtained more reliably, to suppress the drop in the cycle characteristics. Additionally, when the center-to-center distance w is 200 μm or less, an adequate energy density can be obtained more reliably, while the exposed part of the negative electrode current collector relative to the positive electrode active material can be limited more reliably.

The active material layer preferably has a predetermined porosity, in view of securing a larger contact area between the electrolyte and the active material, while easing the stress due to the expansion of the active material. The porosity P of the active material layer can be measured by a method using the mercury porosimeter, or a method by calculating the weight and the thickness of a certain area of the active material layer, and the density of the active material, for example.

For a negative electrode sample used for the measurement of porosity, the sample which was cut out only the portion of the current collector where the active material layer is carried uniformly (evenly) is used. At that time, the sample can be taken out from the part where the active material layer is carried on both sides of the current collector, or can be taken out from the part where the active material layer is carried on one side of the current collector.

For example, when the thickness of the active material layer is set as T, the weight of the active material layer is set as W, and the density of active material is set as D at a specific area S, the porosity P can be obtained by the formula:

$$P(\%) = \frac{ST-(W/D)}{ST} \times 100.$$

Also, in the measurement using the mercury porosimeter, the porosity P can be calculated by the formula:

$$P(\%) = \frac{VH}{VT+VH} \times 100,$$

when the volume of mercury which entered into the gaps of the sample was set as VH, and the true volume of the active material layer was set as VT. When the current collector portion of the sample has uneven surface, the porosity is calculated including the volume of mercury which entered the uneven surface of the current collector as VH.

The porosity P of the negative electrode is preferably 10% or more and 70% or less (10%≦P≦70%), and further preferably 30% or more and 60% or less (30%≦P≦60%), when the active material does not include lithium al all. The porosity P of 10% or more will be sufficient to ease the stress due to expansion and contraction of the columnar particles, and electrolyte contacting the columnar particles can be secured in abundance. When the porosity P is 70% or less, an adequate energy density of the negative electrode will be obtained more reliably, and it can be used as the negative electrode without any problem for any usage.

When the active material includes lithium corresponding to irreversible capacity, the porosity P' of the negative electrode is preferably 5% or more and 60% or less ($5\% \leq P' \leq 60\%$), and further preferably 20% or more and 55% or less ($20\% \leq P' \leq 55\%$).

The thickness t of the active material layer is preferably 0.1 µm or more and 100 µm or less (0.1 µm$\leq$t$\leq$100 µm), and especially preferably 1 µm or more and 50 µm or less (1 µm$\leq$t$\leq$50 µm), for example, in one of the case where the active material includes lithium corresponding to irreversible capacity and the case where the active material does not include lithium corresponding to irreversible capacity, although it may depend upon the diameter of the columnar particles. When the thickness t of the active material layer is 0.1 µm or more, an adequate energy density can be secured more reliably, and high capacity characteristics of lithium secondary battery can be fully utilized. When the thickness t of the active material layer is 100 µm or less, covering of a column of the columnar particles by the other column of the columnar particles can be reduced to a lower degree, while current collecting resistance from the columnar particles can be suppressed to a lower degree more reliably, which is advantageous in high-rate charge and discharge.

All of the parameters showing the center-to-center distance w of adjacent columnar particles, the thickness t of the active material layer, the porosity P, and the diameter d of columnar particles are preferably measured under the condition where the negative electrode active material includes lithium corresponding to the irreversible capacity, or under the condition where lithium corresponding to the irreversible capacity is not included. In other words, these parameters are preferably measured by using a negative electrode not including lithium corresponding to reversible capacity (in the state where reversible capacity equals 0). This condition corresponds to the state where the volume of the negative electrode active material layer in a completed battery is the smallest. When lithium is absorbed by the columnar particles by charging, the columnar particles expand, and the volume of the negative electrode active material layer increases.

When the values of the parameters are obtained in one of the cases where lithium corresponding to irreversible capacity is included and where lithium corresponding to irreversible capacity is not included, by correcting the values, the values in the other case can be obtained as well. For example, when the porosity P of the active material layer not including lithium at all is to be measured by using a mercury porosimeter, the value of the porosity P is corrected by using the volume difference $\Delta V$ of the volume of the active material layer including lithium corresponding to irreversible capacity and the volume of the active material layer not including lithium at all. In this case, the porosity P' including lithium corresponding to irreversible capacity is obtained by the formula: $P'=P-\Delta V$.

The material forming the negative electrode current collector is not limited particularly, but generally, copper, a copper alloy, and the like are used. The sheet-like negative electrode current collector is preferably made by an electrolysis. Although the thickness of the negative electrode current collector is not particularly limited, the thickness of the negative electrode current collector is generally 1 to 50 µm.

The negative electrode current collector preferably has uneven surface with some concavities and convexities on the side thereof carrying the active material layer. To be specific, the surface roughness Rz of the current collector is preferably 0.1 to 100 µm, and further preferably 0.1 to 30 µm. When the surface roughness Rz is 0.1 µm or more, it becomes possible to provide a space between the columnar particles more reliably. Although the average thickness of the current collector increases as the surface roughness Rz increases, when the Rz is 100 µm or less, high capacity characteristics of lithium secondary batteries can be fully utilized.

The negative electrode current collector surface carrying the active material layer preferably has projections of 100000 to 10000000 per unit area (cm$^2$). Although a larger number of projections per unit area are more advantageous in increasing the number of columnar particles to be carried per unit area, the porosity P of the negative electrode tends to become small. A smaller number of projections per unit area is more advantageous in decreasing the number of the columnar particles to be carried per unit area. Thus, depending upon the desired porosity P of the negative electrode, the number of projections in the current collector per unit area is preferably adjusted.

The columnar particle includes an element of silicon. For example, the columnar particle comprises at least one component selected from the group consisting of the simple substance of silicon, a silicon alloy, a compound including silicon and oxygen, and a compound including silicon and nitrogen. One of these components alone can form the active material layer, or a plurality of these components can be used simultaneously to form the active material layer. The compound including silicon and nitrogen may further include oxygen. As an example of the active material layer formed by a plurality of these components, an active material layer comprising a compound including silicon, oxygen, and nitrogen, and an active material layer comprising a composite compound including a plurality of compounds including silicon and oxygen with different proportions of silicon and oxygen can be mentioned.

The metal element M included in the silicon alloy in addition to silicon is preferably a metal element which does not form an alloy with lithium. Any chemically stable electronic conductor can be the metal element M. For example, at least one selected from the group consisting of titanium (Ti), copper (Cu), and nickel (Ni) is preferable. One kind of the metal element M can be included alone in the silicon alloy, or a plurality of kinds of the metal element M can be simultaneously included in the silicon alloy. The mole ratio of silicon and the metal element M in the silicon alloy is preferably in the range below.

When the metal element M is Ti, 0<Ti/Si<2 is preferable, and $0.1 \leq Ti/Si \leq 1.0$ is especially preferable.

When the metal element M is Cu, 0<Cu/Si<4 is preferable, and $0.1 \leq Cu/Si \leq 2.0$ is especially preferable.

When the metal element M is Ni, 0<Ni/Si<2 is preferable, and $0.1 \leq Ni/Si \leq 1.0$ is especially preferable.

The compound including silicon and oxygen preferably comprises a composition represented by the general formula (1): $SiO_x$, where 0<x<2. Herein, the value of x showing the oxygen content is further preferably $0.01 \leq x \leq 1$.

The compound including silicon and nitrogen preferably comprises a composition represented by the general formula (2): $SiN_y$, where 0<y<4/3. Herein, the value of y showing the nitrogen content is further preferably $0.01 \leq x \leq 1$.

Since the present invention has a characteristic structure in the negative electrode, in a lithium secondary battery, components other than the negative electrode are not limited particularly. For example, for the positive electrode active material layer, lithium-containing transition metal oxides such as lithium cobaltate ($LiCoO_2$), lithium nickel oxide ($LiNiO_2$), and lithium manganate ($LiMn_2O_4$) can be used, although not limited thereto. Also, the positive electrode active material layer may be formed only from a positive electrode active material, or may be formed from a material mixture including a positive electrode active material, a binder, and a conductive agent. The positive electrode active material layer can be formed with columnar particles, as in the negative electrode active material layer. For the positive electrode current collector, Al, an Al alloy, Ni, Ti, and the like can be used.

For the lithium ion conductive electrolyte, various lithium ion conductive solid electrolytes, and non-aqueous electrolytes are used. For the non-aqueous electrolyte, the one in which a lithium salt is dissolved in a non-aqueous solvent is preferably used. The composition of the non-aqueous electrolyte is not particularly limited.

The separator and the outer case are not particularly limited as well. Materials in various forms used in lithium secondary batteries may be used without any particular limitation.

The present invention is described in detail based on Examples. But Examples below are not to limit the present invention.

Example 1

A laminated lithium secondary battery shown in FIG. 1 was made.
(i) Preparation of Positive Electrode A positive electrode material mixture paste was prepared by sufficiently mixing 10 g of lithium cobaltate (LiCoO$_2$) powder with the average particle size of about 10 μm as a positive electrode active material, 0.3 g of acetylene black as a conductive agent, 0.8 g of polyvinylidene fluoride powder as a binder, and an appropriate amount of N-methyl-2-pyrrolidone (NMP). The obtained paste was applied on one side of a positive electrode current collector 11a comprising an aluminum foil with a thickness of 20 μm, dried, and rolled, to form a positive electrode active material layer 11b. Subsequently, a positive electrode was cut out to give a predetermined form. In the obtained positive electrode, the positive electrode active material layer carried on one side of the aluminum foil had a thickness of 50 μm, and a size of 30 mm×30 mm. To the current collector rear side having no positive electrode active material layer, a lead was connected.
(ii) Preparation of Negative Electrode A negative electrode 12 was prepared by using a vapor-deposition apparatus 30 (manufactured by ULVAC, Inc.) shown in FIG. 3 having an electron beam (EB) heater (not shown). The vapor-deposition apparatus 30 has a gas pipe (not shown) for introducing an oxygen gas into a vacuum chamber 31, and a nozzle 32. The nozzle 32 was connected to a pipe 33 provided in the vacuum chamber 31. The pipe 33 was connected to an oxygen cylinder via a mass flow controller. An oxygen gas (manufactured by Nippon Sanso Corporation) with 99.7% purity was released from the nozzle 32 with the flow rate of 80 sccm. A fixing board 34 for fixing the negative electrode current collector 12a was provided on the upper side of the nozzle 32. At the lower side in the vertical direction relative to the fixing board 34, a target 35 was disposed for depositing onto the surface of the negative electrode current collector 12a to form columns. For the target 35, the simple substance of silicon (manufactured by Kojundo Chemical Lab. Co. Ltd.) with 99.9999% purity was used.

An electrolyte copper foil (manufactured by Furukawa Circuit Foil Co., Ltd.) with the thickness of 35 μm and the surface roughness Rz of 10 μm was cut into the size of 40 mm×40 mm and then fixed on the fixing board 34. The fixing board 34 was tilted to form an angle α of 60° with the horizontal plane. The angle α formed between the fixing board 34 and the horizontal plane, and the growth direction θ of the columnar particles generally satisfy the relationship of tan α=2 tan θ.

The electron beam was applied to the target 35 comprising the simple substance of silicon with an accelerating voltage of −8 kV and an emission of 500 mA. A vapor of the simple substance of silicon was passed through an oxygen atmosphere, and then deposited on the copper foil disposed on the fixing board 34, to form a negative electrode active material layer 12b comprising a compound including silicon and oxygen. The duration of the vapor-deposition was set as 20 minutes. A negative electrode thus obtained was named a negative electrode 1A.

As an amount of oxygen included in the obtained negative electrode active material layer 12b was quantified by a combustion method, it was found that the composition of the compound including silicon and oxygen was $SiO_{0.5}$.

Figure 4:
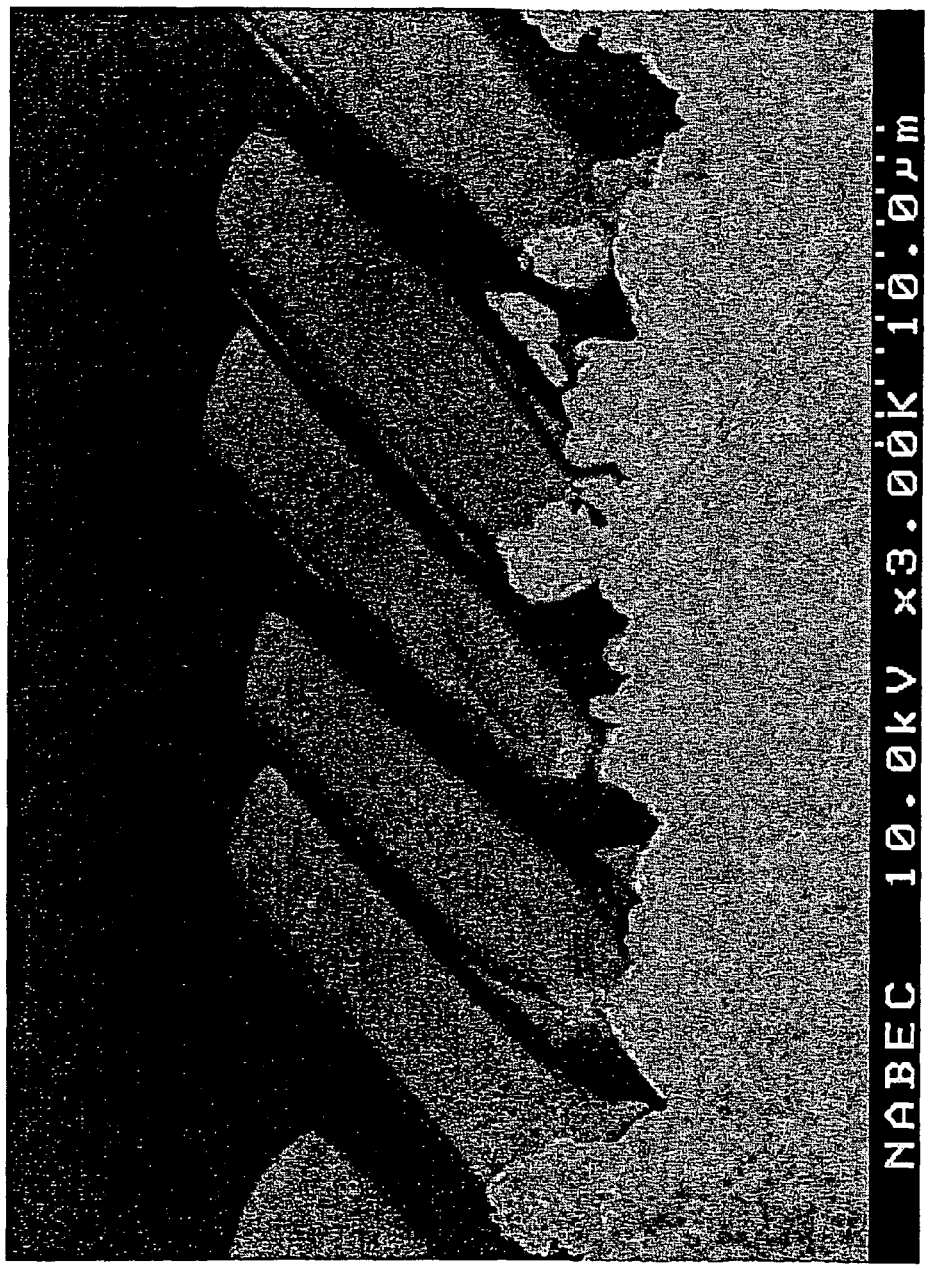
FIG. 4 is an SEM image of a cross section parallel to the columnar particles of a negative electrode for lithium secondary battery of the present invention.

Then, a cross section of the negative electrode 1A was observed by an electron microscope, to check the angle θ formed between the columnar particles forming the active material layer and the normal direction of the copper foil. The observed image is shown in FIG. 4. From FIG. 4, it was confirmed that the active material formed the columnar particles, and that the angle θ formed between the columnar particles and the normal direction of the copper foil was 45°.

Also, the negative electrode 1A was observed from the normal direction of the copper foil to obtain the exposure ratio S of the current collector. But no exposed portion of the copper foil was observed at all, and the exposure ratio S of the current collector was 0%. The measurement of the exposure ratio S of the current collector was carried out by using both an SEM observation from the normal direction of the copper foil of the surface of the negative electrode 1A and an EPMA (electron probe microanalysis: element mapping analysis). A square area with a side of 50 μm or more was observed, and the value of S was calculated as the average within the area.

The thickness t of the active material layer was 11 μm, and the center-to-center distance of the adjacent columnar particles was 7 μm at the mid-height of the columnar particles. The diameter of the columnar particles at the mid-height was 5 μm.

Then, a mercury porosimeter (Autopore III 9410 available from Shimadzu Corporation) was used to obtain the porosity P of the negative electrodes 1A, as in the following. On one side of the copper foil (the surface roughness Rz=10 μm, and the thickness of 35 μm) with the size of 3 cm×3 cm, the columnar particles of $SiO_{0.5}$ were formed uniformly, to prepare a sample of the negative electrode 1A, under the same conditions as the above. From the obtained weight of the sample, the weight of the copper foil was deducted to obtain the weight of the active material layer, and the true volume (VT) of the active material layer was obtained from the density of $SiO_{0.5}$. Then, by a mercury porosimeter, mercury was entered into the gaps of the sample and the volume (VH) of the entered mercury was obtained. The porosity P obtained from the true volume (VT) of the active material layer and the volume (VH) of the mercury entered into the gaps of the sample was 30%. As this value was corrected by using the volume difference ΔV obtained in advance of the case where lithium corresponding to irreversible capacity was included and of the case where lithium was not included at all, the porosity P' was found to be 22%.

For confirmation, on one side of a copper foil (the surface roughness Rz=10 μm, the thickness of 35 μm) with the size of 3 cm×3 cm, the columnar particles of $SiO_{0.5}$ was formed uniformly to form a sample of the negative electrode 1A, under the same conditions as in the above. From the weight of the obtained sample, the weight of the copper foil was deducted to obtain the weight W of the active material layer. From the value of W and the density D of $SiO_{0.5}$ which absorbed lithium of irreversible capacity, the volume (W/D) of the active material layer was obtained. Additionally, from the thickness t of the thin film (11 μm), and the area S (3 cm×3 cm=9 cm²), the volume (ST) of the active material layer was obtained. As the porosity P was calculated from these values and the formula:

$$P(\%) = \frac{ST - (W/D)}{ST} \times 100,$$

it was found that the porosity P was 30%.

Next, a lithium metal was deposited on the negative electrode 1A by using a resistance heating vapor-deposition apparatus manufactured by ULVAC, Inc. A predetermined amount of lithium metal was placed in a tantalum boat in the vapor-deposition apparatus, and the negative electrode 1A was fixed to face the boat. A vapor-deposition was carried out for 10 minutes by setting the current value applied to the boat as 50A. By thus depositing lithium metal, lithium of irreversible capacity to be stored at the first charge and discharge was supplemented to the negative electrode active material comprising $SiO_{0.5}$. Afterwards, the negative electrode 1A was cut to give the size of 31 mm×31 mm. To the rear side of the current collector having no negative electrode active material layer, a lead was connected.

Properties of the negative electrode 1A are summarized below.

Composition of Active Material: $SiO_{0.5}$

Angle θ Formed Between Column-like particles and Normal Direction of Current Collector: 45°

Thickness t of Active Material Layer: 11 μm

Center-to-center Distance of Column-like Particles Adjacent to Each Other: 7 μm

Diameter of Column-like Particles: 5 μm

Surface Roughness Rz: 10 μm

Exposure Ratio S of the Current Collector: 0%

Porosity P: 30%

(iii) Preparation of Test Battery

The positive electrode active material layer 11b and the negative electrode active material layer 12b were faced interposing the separator 13 comprising a polyethylene micro porous film with the thickness of 20 μm, manufactured by Asahi Kasei Corporation, to form a thin electrode plate assembly. With an electrolyte, this electrode plate assembly was inserted into the outer case 14 comprising an aluminum laminate sheet. For the electrolyte, a non-aqueous electrolyte prepared by dissolving $LiPF_6$ in the 1:1 (by volume) mixture of ethylene carbonate (EC) and ethyl methyl carbonate (EMC) with the concentration of 1.0 mol/L was used.

After impregnating the positive electrode active material layer 11b, the negative electrode active material layer 12b, and the separator 13 with the non-aqueous electrolyte, the peripheral ends of the outer case 14 were welded while conducting a vacuum decompression with the positive electrode lead 15 and the negative electrode lead 16 drawn out to the outside, to complete a test battery. The obtained test battery was named a battery 1A.

Comparative Example 1

A negative electrode was prepared as in below.

Figure 3:
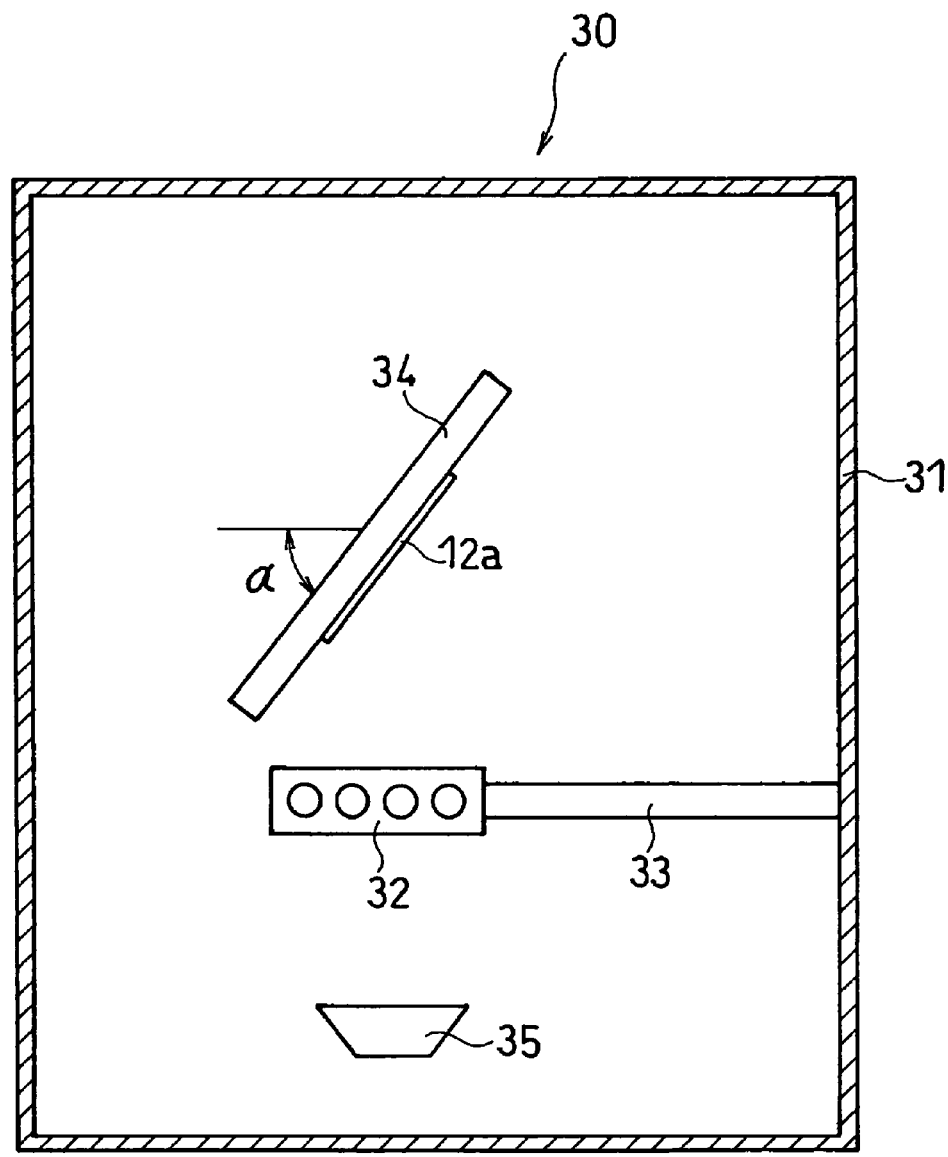
FIG. 3 is a schematic view illustrating an example of an apparatus for producing a negative electrode for lithium secondary battery of the present invention.

Onto an electrolyte copper foil (manufactured by Furukawa Circuit Foil Co., Ltd.) with the thickness of 35 μm and the surface roughness Rz of 10 μm, a dry film resist manufactured by Hitachi Chemical Co., Ltd. was laminated. By using a photo mask in which a plurality of dots respectively having a diameter of 30 μm were disposed to form patterns with an interval of 10 μm, the dry film resist on the copper foil was exposed to light, and then developed with an aqueous solution of $NaHCO_3$. Subsequently, the copper foil was washed with water and dried, and then a vapor-deposition was carried out by using a vapor-deposition apparatus as shown in FIG. 3.

A copper foil having the laminated resist in which a plurality of holes respectively having a diameter of 30 μm were disposed with the interval of 10 μm was fixed on the fixing board 34. The copper foil was disposed horizontally by making the angle θ formed by the fixing board and the horizontal plane as 0°. The electron beam applied to the target 35 composed of the simple substance of silicon, was set to have an accelerating voltage of −8 kV and an emission of 500 mA. A vapor of the simple substance of silicon was passed through an oxygen atmosphere, and then deposited on the copper foil disposed on the fixing board 34, to form an active material layer comprising a compound including silicon and oxygen. The period of the vapor-deposition was set as 30 minutes. Subsequently, the copper foil carrying the active material layer was immersed in an aqueous solution of sodium hydroxide, to remove the resist and a film of the compound attached on the resist. A negative electrode thus obtained was named as a negative electrode 1B.

An amount of oxygen included in the obtained active material layer was quantified by a combustion method, and it was found that the composition of the compound including silicon and oxygen was $SiO_{0.5}$.

Then, a cross section of the negative electrode 1B was observed by an electron microscope, and it was confirmed that the active material formed the columnar particles, and that the angle θ formed between the columnar particles and the normal direction of the copper foil was 0° (i.e. perpendicular to the copper foil surface).

Further, the negative electrode 1B was observed from the normal direction of the copper foil, the exposed portion of the copper foil was observed, and the exposure ratio S of the current collector was 49%. Further, the porosity P of the negative electrode 1B obtained by using the mercury porosimeter was 49%. The porosity P $$\frac{ST - (W/D)}{ST} \times 100$$

measured by the weight and the volume was 49%, as measured by the mercury porosimeter.

The thickness t of the active material layer was 16.5 μm, and the center-to-center distance of the adjacent columnar particles was 40 μm at the mid-height of the columnar particles. The diameter of the columnar particles at the mid-height was 30 μm.

Next, a lithium metal was deposited on the negative electrode 1B by using a resistance heating vapor-deposition apparatus manufactured by ULVAC, Inc., in the same manner as Example 1. By thus depositing lithium metal, lithium of irreversible capacity to be stored at the first charge and discharge was supplemented to the negative electrode active material comprising $SiO_{0.5}$.

Properties of the negative electrode 1B are summarized below.
Composition of Active Material: $SiO_{0.5}$
Angle θ Formed Between Column-like particles and Normal Direction of Current Collector: 0°
Thickness t of Active Material Layer: 16.5 μm
Center-to-center Distance of Column-like Particles Adjacent to Each Other: 40 μm
Diameter of columnar particles: 30 μm
Exposure ratio S of the current collector: 49%
Porosity P: 49%

A test battery 1B was prepared in the same manner as Example 1, except that the negative electrode thus obtained was used.

[Evaluation Method]
(i) Injection Period

In the preparation of the test battery, after injecting the non-aqueous electrolyte in the outer case, at the time of evacuating to set the internal pressure of the case to 10 Torr, the period of which the air (gas) remained in the electrode plate assembly was completely discharged was measured. This period was set as an injection period. The results are shown in Table 1.

(ii) Discharge Characteristics

The batteries 1A and 1B were respectively placed in a constant temperature chamber of 20° C., and then charged with a constant-current and constant-voltage method, in which the batteries were charged with a constant current of 1 C rate (1 C is a current value which enables to use up all the battery capacity by one hour) until the battery voltage reached 4.2 V, and then upon reaching 4.2 V, the batteries were charged with a constant voltage until the current value reached 0.05 C. The batteries completed the charging were left for 20 minutes, and then discharged with a high-rate constant current of 1 C rate, until the battery voltage reached 2.5 V. After the high-rate discharge, the batteries were re-discharged further with the constant current of 0.2 C until the battery voltage reached 2.5 V. After the re-discharge, the batteries were left for 20 minutes.

The above charge and discharge was repeated for 100 cycles.

In the initial period of the cycle, the ratio of total discharge capacity (total of high-rate discharge and re-discharge) relative to the charge capacity was obtained by percentage as charge and discharge efficiency. Additionally, in the initial period of the cycle, the ratio of discharge capacity at a high-rate discharge relative to the total discharge capacity was obtained by percentage as a high-rate ratio. Further, the ratio of the total discharge capacity at 100th cycle relative to the total discharge capacity at the initial period of the cycle was obtained by percentage as a capacity retention rate. The results are shown in Table 1.

TABLE 1

| | Injection Period (second) | Charge and Discharge Efficiency (%) | High-rate Ratio (%) | Capacity Retention Rate (%) |
|---|---|---|---|---|
| Battery 1A | 22 | 98 | 90 | 93 |
| Battery 1B | 65 | 81 | 81 | 61 |

Table 1 shows that the injection period is shorter in Battery 1A, compared with Battery 1B. The improved non-aqueous electrolyte permeability in Battery 1A is probably due to the tilt of the columnar particles of negative electrode active material by 45° relative to the normal direction of the copper foil. The tilting and the long and narrow growth of the columnar particles probably orientated the moving direction of air existing between the particles, to easily release air from the active material layer.

Additionally, compared with Battery 1B, Battery 1A has a higher charge and discharge efficiency, a higher high-rate ratio, and a greatly improved capacity retention rate. The higher charge and discharge efficiency and the higher high-rate ratio in the initial period of the cycle are probably contributed by the tilt of the columnar particles of the negative electrode active material, which increased the facing portion between the negative electrode active material and the positive electrode active material to cause an efficient absorption of lithium metal deposited on the negative electrode active material by the negative electrode active material, and to completely supplement the irreversible capacity of the negative electrode active material. Also, the increase in the facing portion between the negative electrode active material and the positive electrode active material causes a homogeneous charge and discharge reaction, which suppresses lithium deposit reaction and partial over-charge and over-discharge of the positive electrode, thereby making it advantageous for the improvement of capacity retention rate.

Example 2

Negative electrodes 2A to 2F below were made in the same manner as Example 1, except that in the formation of a negative electrode active material, a surface roughness Rz of the electrolyte copper foil was changed, while changing an angle α formed by the fixing board 35 of the vapor-deposition apparatus in FIG. 3 and the horizontal plane, adjusting conditions for vapor-deposition, and changing an angle θ formed by the current collector and the columnar particles. Additionally, Test Batteries 2A to 2F were made in the same manner as Example 1, except that the negative electrodes 2A to 2F were used.

<i> Negative Electrode 2A

A negative electrode was prepared in the same manner as Example 1, except that an electrolyte copper foil with the surface roughness Rz of 30 μm was used for a current collector; an angle α formed between the fixing board 35 and the horizontal plane was set to 10°; and the vapor-deposition period was set to 14 minutes.

Properties of the negative electrode 2A are summarized below.
Composition of Active Material: $SiO_{0.5}$
Angle θ Formed Between Column-like particles and Normal Direction of Current Collector: 5°
Thickness t of Active Material Layer: 11 μm
Center-to-center Distance of Column-like Particles Adjacent to Each Other: 7 μm
Diameter of Column-like Particles: 5 μm
Surface Roughness Rz: 30 μm
Exposure Ratio S of the Current Collector: 55%
Porosity P: 30%

<ii> Negative Electrode 2B

A negative electrode was prepared in the same manner as Example 1, except that an electrolyte copper foil with the surface roughness Rz of 20 μm was used for a current collector; an angle α formed between the fixing board 35 and the horizontal plane was set to 20°; and the vapor-deposition period was set to 14 minutes.

Properties of the negative electrode 2B are summarized below.
Composition of Active Material: $SiO_{0.5}$
Angle θ Formed Between Column-like particles and Normal Direction of Current Collector: 10°
Thickness t of Active Material Layer: 11 μm
Center-to-center Distance of Column-like Particles Adjacent to Each Other: 7 μm
Diameter of Column-like Particles: 5 μm
Surface Roughness Rz: 20 μm
Exposure Ratio s of the Current Collector: 10%
Porosity P: 30%

<iii> Negative Electrode 2C

A negative electrode was prepared in the same manner as Example 1, except that an electrolyte copper foil with the surface roughness Rz of 15 μm was used for a current collector; an angle α formed between the fixing board 35 and the horizontal plane was set to 50°; and the vapor-deposition period was set to 16 minutes.

Properties of the negative electrode 2C are summarized below.
Composition of Active Material: $SiO_{0.5}$
Angle θ Formed Between Column-like particles and Normal Direction of Current Collector: 30°
Thickness t of Active Material Layer: 11 μm
Center-to-center Distance of Column-like Particles Adjacent to Each Other: 7 μm
Diameter of Column-like Particles: 5 μm
Surface Roughness Rz: 15 μm
Exposure Ratio S of the Current Collector: 0%
Porosity P: 30%

<iv> Negative Electrode 2D

A negative electrode was prepared in the same manner as Example 1, except that an electrolyte copper foil with the surface roughness Rz of 5 μm was used for a current collector; an angle α formed between the fixing board 35 and the horizontal plane was set to 74°; and the deposition period was set to 28 minutes.

Properties of the negative electrode 2D are summarized below.
Composition of Active Material: $SiO_{0.5}$
Angle θ Formed Between Column-like particles and Normal Direction of Current Collector: 60°
Thickness t of Active Material Layer: 11 μm
Center-to-center Distance of Column-like Particles Adjacent to Each Other: 7 μm
Diameter of Column-like Particles: 5 μm
Surface Roughness Rz: 5 μm
Exposure Ratio S of the Current Collector: 0%
Porosity P: 30%

<v> Negative Electrode 2E

A negative electrode was prepared in the same manner as Example 1, except that an electrolyte copper foil with the surface roughness Rz of 2 μm was used for a current collector; an angle α formed between the fixing board 35 and the horizontal plane was set to 85°; and the vapor-deposition period was set to 81 minutes.

Properties of the negative electrode 2E are summarized below.
Composition of Active Material: $SiO_{0.5}$
Angle θ Formed Between Column-like particles and Normal Direction of Current Collector: 80°
Thickness t of Active Material Layer: 11 μm
Center-to-center Distance of Column-like Particles Adjacent to Each Other: 7 μm
Diameter of Column-like Particles: 5 μm
Surface Roughness Rz: 2 μm
Exposure Ratio S of the Current Collector: 0%
Porosity P: 30%

<vi> Negative Electrode 2F

A negative electrode was prepared in the same manner as Example 1, except that an electrolyte copper foil with the surface roughness Rz of 1 μm was used for a current collector; an angle α formed between the fixing board 35 and the horizontal plane was set to 90°; and the vapor-deposition period was set to 810 minutes.

Properties of the negative electrode 2F are summarized below.
Composition of Active Material: $SiO_{0.5}$
Angle θ Formed Between Column-like particles and Normal Direction of Current Collector: 89°
Thickness t of Active Material Layer: 11 μm
Center-to-center Distance of Column-like Particles Adjacent to Each Other: 7 μm
Diameter of Column-like Particles: 5 μm
Surface Roughness Rz: 1 μm
Exposure Ratio S of The Current Collector: 0%
Porosity P: 30%

Charge and discharge efficiency, high-rate ratio, and capacity retention rate of the Batteries 2A to 2F were measured in the same manner as the above. The results are shown in Table 2.

TABLE 2

|  | Charge and Discharge Efficiency (%) | High-rate Ratio (%) | Capacity Retention Rate (%) |
| --- | --- | --- | --- |
| Battery 2A | 90 | 81 | 70 |
| Battery 2B | 99 | 87 | 90 |
| Battery 2C | 98 | 88 | 94 |
| Battery 2D | 98 | 90 | 91 |
| Battery 2E | 97 | 90 | 89 |
| Battery 2F | 96 | 87 | 85 |

The results show that the Battery 2A is relatively inferior to other batteries in all aspects of charge and discharge efficiency, high-rate ratio, and capacity retention rate. The relatively inferior charge and discharge efficiency is probably because the large exposure ratio S of the current collector in the negative electrode caused the lithium metal vapor-deposited on the negative electrode to deposit on the copper foil, thereby failing to completely supplement the irreversible capacity of the negative electrode active material. The relatively inferior high-rate ratio is probably due to the decrease in the facing portion between the negative electrode active material layer and the positive electrode active material layer. Further, the relatively decreased capacity retention rate is probably due to the fact that lithium deposition reaction and the partial over-discharge and over-charge of the positive electrode were caused.

On the other hand, any of the Batteries 2B to 2F had charge and discharge efficiency of 96% or more, the high high-rate ratio, and the capacity retention rate of 85% or more, showing excellent results in all characteristics. The above results revealed that the appropriate range of the angle θ formed between columnar particles and normal direction of current collector was 10° or more and less than 90° ($10° \leq θ < 90°$).

Example 3

Negative electrodes 3A to 3E below were made in the same manner as Example 1, except that in the formation of a negative electrode active material, a surface roughness Rz of the electrolyte copper foil was changed. Additionally, Test Batteries 3A to 3E were made in the same manner as Example 1, except that the negative electrodes 3A to 3E were used and the thickness of the positive electrode active material layer was changed.

<i> Negative Electrode 3A

A negative electrode 3A was made in the same manner as Example 1, except that a rolled copper foil with the surface roughness Rz of 0.3 μm was used for a current collector. Test battery 3A was made in the same manner as Example 1, except that the negative electrode 3A was used, while the thickness of the positive electrode active material layer was changed to 71 μm.

Properties of the negative electrode 3A are summarized below.
Composition of Active Material: $SiO_{0.5}$
Angle θ Formed Between Column-like particles and Normal Direction of Current Collector: 45°
Thickness t of Active Material Layer: 11 μm
Center-to-center Distance of Column-like Particles Adjacent to Each Other: 5.1 μm
Diameter of Column-like Particles: 5 μm
Surface Roughness Rz: 0.3 μm
Exposure Ratio S of the Current Collector: 0%
Porosity P: 1%

<ii> Negative Electrode 3B

A negative electrode 3B was made in the same manner as Example 1, except that an electrolyte copper foil with the surface roughness Rz of 2 μm was used for a current collector. Test battery 3B was made in the same manner as Example 1, except that the negative electrode 3B was used, while the thickness of the positive electrode active material layer was changed to 65 μm.

Properties of the negative electrode 3B are summarized below.
Composition of Active Material: $SiO_{0.5}$
Angle θ Formed Between Column-like particles and Normal Direction of Current Collector: 45°
Thickness t of Active Material Layer: 11 μm
Center-to-center Distance of Column-like Particles Adjacent to Each Other: 5.3 μm
Diameter of Column-like Particles: 5 μm
Surface Roughness Rz: 2 μm
Exposure Ratio S of the Current Collector: 0%
Porosity P: 10%

<iii> Negative Electrode 3C

A negative electrode 3C was made in the same manner as Example 1, except that an electrolyte copper foil with the surface roughness Rz of 15 μm was used for a current collector. Test battery 3C was made in the same manner as Example 1, except that the negative electrode 3C was used, while the thickness of the positive electrode active material layer was changed to 36 μm.

Properties of the negative electrode 3C are summarized below.
Composition of Active Material: $SiO_{0.5}$
Angle θ Formed Between Column-like particles and Normal Direction of Current Collector: 45°
Thickness t of Active Material Layer: 11 μm
Center-to-center Distance of Column-like Particles Adjacent to Each Other: 8 μm
Diameter of Column-like Particles: 5 μm
Surface Roughness Rz: 15 μm
Exposure Ratio S of the Current Collector: 0%
Porosity P: 50%

<iv> Negative Electrode 3D

A negative electrode 3D was made in the same manner as Example 1, except that an electrolyte copper foil with the surface roughness Rz of 20 μm was used for a current collector. Test battery 3D was made in the same manner as Example 1, except that the negative electrode 3D was used, while the thickness of the positive electrode active material layer was changed to 22 μm.

Properties of the negative electrode 3D are summarized below.
Composition of Active Material: $SiO_{0.5}$
Angle θ Formed Between Column-like particles and Normal Direction of Current Collector: 45°
Thickness t of Active Material Layer: 11 μm
Center-to-center Distance of Column-like Particles Adjacent to Each Other: 8 μm
Diameter of Column-like Particles: 5 μm
Surface Roughness Rz: 15 μm
Exposure Ratio S of the Current Collector: 0%
Porosity P: 70%

<v> Negative Electrode 3E

A negative electrode 3E was made in the same manner as Example 1, except that an electrolyte copper foil with the surface roughness Rz of 30 μm was used for a current collector. Test battery 3E was made in the same manner as Example 1, except that the negative electrode 3E was used, while the thickness of the positive electrode active material layer was changed to 20 μm.

Properties of the negative electrode 3E are summarized below.
Composition of Active Material: $SiO_{0.5}$
Angle θ Formed Between Column-like particles and Normal Direction of Current Collector: 45°
Thickness t of Active Material Layer: 11 μm
Center-to-center Distance of Column-like Particles Adjacent to Each Other: 9 μm
Diameter of Column-like Particles: 5 μm
Surface Roughness Rz: 30 μm
Exposure Ratio S of The Current Collector: 0%
Porosity P: 72%

Charge and discharge efficiency, high-rate ratio, and capacity retention rate of the Batteries 3A to 3E were measured in the same manner as the above. The results are shown in Table 3.

TABLE 3

|  | Charge and Discharge Efficiency (%) | High-rate Ratio (%) | Capacity Retention Rate (%) |
| --- | --- | --- | --- |
| Battery 3A | 98 | 85 | 75 |
| Battery 3B | 98 | 87 | 90 |
| Battery 3C | 98 | 90 | 92 |
| Battery 3D | 97 | 90 | 92 |
| Battery 3E | 87 | 90 | 70 |

The results show that the battery 3A is relatively inferior in the high-rate ratio. This is probably due to the shorter center-to-center distance of columnar particles which suppressed the contact between the non-aqueous electrolyte and the active material. Also, the expansion of the active material caused cracks and peelings or separations of the columnar particles, thereby declining current collecting ability.

On the other hand, the batteries 3B to 3D showed excellent results in any aspects of the characteristics. The battery 3E showed relatively inferior results in the charge and discharge efficiency and capacity retention rate. This is probably due to the wide center-to-center distance of columnar particles and the higher porosity of negative electrode, which caused lithium metal to deposit on the copper foil at the time of supplementing the irreversible capacity by vapor depositing lithium metal. Since the lithium metal deposited on the copper foil is denatured or deteriorated by oxidation or the like before the formation of a battery, it probably does not contribute to the supplemental capacity. Also, the decline in the capacity retention rate is probably due to lithium deposit reaction and partial over-charge and over-discharge of positive electrode.

Example 4

<i> Negative Electrode 4A

A negative electrode 4A was made in the same manner as Example 1, except that the vapor-deposition period was set to 11 seconds.

Properties of the negative electrode 4A are summarized below.
Composition of Active Material: $SiO_{0.5}$
Angle θ Formed Between Column-like particles and Normal Direction of Current Collector: 45°
Thickness t of Active Material Layer: 0.1 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

A positive electrode was made by using RF magnetron sputter apparatus, as in below.

For a positive electrode current collector, a stainless steel foil (SUS304) with the thickness of 20 μm was used. For a target, $LiCoO_2$ with the diameter of 4 inches and the thickness of 5 mm was used. When an argon gas was introduced into a vacuum chamber with the flow rate of 100 sccm, the pressure in the vacuum chamber had 20 m Torr. A sputtering was carried out for 10 minutes by setting the output of a high-frequency power source to 100 W. Subsequently, the stainless steel foil on which a thin film of $LiCoO_2$ was formed was taken out, and baked by a furnace in the atmosphere at 500° C. for 5 hours, to form a positive electrode active material layer with the thickness of 120 μm. As the results of analysis on the formed positive electrode active material layer by the Inductively Coupled Plasma Spectrometry (ICP spectrometry) and by an oxygen analysis, it was found that the mole ratio of Li, Co, and oxygen included in the positive electrode active material was 1:1:2. The positive electrode thus obtained was named a positive electrode 4A.

A test battery 4A was made in the same manner as Example 1, except that the negative electrode 4A was used together with the positive electrode 4A.

<ii> Negative Electrode 4B

A negative electrode 4B was made in the same manner as Example 1, except that the vapor-deposition period was set to 145 minutes.

Properties of the negative electrode 4B are summarized below.
Composition of Active Material: $SiO_{0.5}$
Angle θ Formed Between Column-like particles and Normal Direction of Current Collector: 45°
Thickness t of Active Material Layer: 80 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

A positive electrode 4B was made in the same manner as the positive electrode in Example 1, except that the thickness of the positive electrode active material was changed to 98 μm.

A test battery 4B was made in the same manner as Example 1, except that the negative electrode 4B was used together with the positive electrode 4B.

<iii> Negative Electrode 4C

A negative electrode 4C was made in the same manner as Example 1, except that the vapor-deposition period was set to 182 minutes.

Properties of the negative electrode 4C are summarized below.
Composition of Active Material: $SiO_{0.5}$
Angle θ Formed Between Column-like particles and Normal Direction of Current Collector: 45°
Thickness t of Active Material Layer: 100 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

A positive electrode 4C was made in the same manner as the positive electrode in Example 1, except that the thickness of the positive electrode active material was changed to 123 μm.

A test battery 4C was made in the same manner as Example 1, except that the negative electrode 4C was used together with the positive electrode 4C.

<iv> Negative Electrode 4D

A negative electrode 4D was made in the same manner as Example 1, except that the vapor-deposition period was set to 218 minutes.

Properties of the negative electrode 4D are summarized below.
Composition of Active Material: $SiO_{0.5}$
Angle θ Formed Between Column-like particles and Normal Direction of Current Collector: 45°
Thickness t of Active Material Layer: 120 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

A positive electrode 4D was made in the same manner as the positive electrode in Example 1, except that the thickness of the positive electrode active material was changed to 147 μm.

A test battery 4D was made in the same manner as Example 1, except that the negative electrode 4D was used together with the positive electrode 4D.

Charge and discharge efficiency, high-rate ratio, and capacity retention rate of the Batteries 4A to 4D were measured in the same manner as the above. The results are shown in Table 4.

TABLE 4

|  | Charge and Discharge Efficiency (%) | High-rate Ratio (%) | Capacity Retention Rate (%) |
| --- | --- | --- | --- |
| Battery 4A | 98 | 95 | 95 |
| Battery 4B | 98 | 88 | 81 |
| Battery 4C | 98 | 86 | 74 |
| Battery 4D | 98 | 85 | 69 |

The above results show that the capacity retention rate tends to decline as the thickness of active material layer increases. Also, the results show that the high-rate ratio is relatively inferior in the battery 4D. This is probably because the columnar particles of negative electrode active material layer were longer to relatively decrease the contact area between the copper foil and the active material, thereby increasing the resistance. The increase in resistance causes non-homogeneous charge and discharge reaction, thereby causing deterioration in cycle characteristics.

The results of the battery 4A show that although there is no problem in the charge and discharge efficiency, high-rate ratio, and capacity retention rate even the thickness of the active material layer was 0.1 μm, there would be limitations in practical use due to a small capacity per unit area. The above results show that the appropriate range for the thickness of the active material layer is 0.1 μm to 100 μm.

Example 5

Negative electrodes 5A to 5F below were made in the same manner as Example 1, except that the conditions for the vapor-deposition were adjusted to change the proportion of silicon and oxygen in the formation of a negative electrode active material. Additionally, Test Batteries 5A to 5F were made in the same manner as Example 1, except that the negative electrodes 5A to 5F were used.

<i> Negative Electrode 5A

A negative electrode 5A was made in the same manner as Example 1, except that the flow rate of oxygen was set to 0 sccm, and vapor-deposition period was set to 7 minutes at the time of forming the negative electrode active material. As the results of the quantification of the amount of oxygen included in the obtained active material layer by a combustion method, it was found that the oxygen content was 1% or less.

Properties of the negative electrode 5A are summarized below.
Composition of Active Material: Si (simple substance)
Angle θ Formed Between Column-like particles and Normal Direction of Current Collector: 45°
Thickness t of Active Material Layer: 6 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<ii> Negative Electrode 5B

A negative electrode 5B was made in the same manner as Example 1, except that the flow rate of oxygen was set to 16 sccm, and vapor-deposition period was set to 8 minutes at the time of forming the negative electrode active material. As the results of the quantification of the amount of oxygen included in the obtained active material layer by a combustion method, it was found that the composition of the compound including silicon and oxygen was $SiO_{0.1}$.

Properties of the negative electrode 5B are summarized below.
Composition of Active Material: $SiO_{0.1}$
Angle θ Formed Between Column-like particles and Normal Direction of Current Collector: 45°
Thickness t of Active Material Layer: 7 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<iii> Negative Electrode 5C

A negative electrode 5C was made in the same manner as Example 1, except that the flow rate of oxygen was set to 32 sccm, and vapor-deposition period was set to 9 minutes at the time of forming the negative electrode active material. As the results of the quantification of the amount of oxygen included in the obtained active material layer by a combustion method, it was found that the composition of the compound including silicon and oxygen was $SiO_{0.2}$.

Properties of the negative electrode 5C are summarized below.
Composition of Active Material: $SiO_{0.2}$
Angle θ Formed Between Column-like particles and Normal Direction of Current Collector: 45°
Thickness t of Active Material Layer: 8 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<iv> Negative Electrode 5D

A negative electrode 5D was made in the same manner as Example 1, except that the flow rate of oxygen was set to 48 sccm, and vapor-deposition period was set to 10 minutes at the time of forming the negative electrode active material. As the results of the quantification of the amount of oxygen included in the obtained active material layer by a combustion method, it was found that the composition of the compound including silicon and oxygen was $SiO_{0.3}$.

Properties of the negative electrode 5D are summarized below.
Composition of Active Material: $SiO_{0.3}$
Angle θ Formed Between Column-like particles and Normal Direction of Current Collector: 45°
Thickness t of Active Material Layer: 9 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<v> Negative Electrode 5E

A negative electrode 5E was made in the same manner as Example 1, except that the flow rate of oxygen was set to 64 sccm, and vapor-deposition period was set to 11 minutes at the time of forming the negative electrode active material. As the results of the quantification of the amount of oxygen included in the obtained active material layer by a combustion method, it was found that the composition of the compound including silicon and oxygen was $SiO_{0.4}$.

Properties of the negative electrode 5E are summarized below.
Composition of Active Material: $SiO_{0.4}$
Angle θ Formed Between Column-like particles and Normal Direction of Current Collector: 45°
Thickness t of Active Material Layer: 10 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<vi> Negative Electrode 5F

A negative electrode 5F was made in the same manner as Example 1, except that the flow rate of oxygen was set to 160 scam, and vapor-deposition period was set to 37 minutes at the time of forming the negative electrode active material. As the results of the quantification of the amount of oxygen included in the obtained active material layer by a combustion method, it was found that the composition of the compound including silicon and oxygen was $SiO_{1.0}$.

Properties of the negative electrode 5F are summarized below.
Composition of Active Material: $SiO_{1.0}$
Angle θ Formed Between Column-like particles and Normal Direction of Current Collector: 45°
Thickness t of Active Material Layer: 17 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%
<vii> Negative Electrode 5G A negative electrode 5G was made in the same manner as Example 1, except that bulk silicon dioxide manufactured by Kojundo Chemical Lab. Co. Ltd. was used as the target 35, the flow rate of oxygen was set to 20 sccm, and the emission was set to 500 mA, at the time of forming the negative electrode active material. A test battery 5G was also made in the same manner as Example 1, except that the negative electrode 5G was used. As the results of the quantification of the amount of oxygen included in the obtained active material layer by a combustion method, it was found that the composition of the compound including silicon and oxygen was $SiO_2$.

Properties of the negative electrode 5G are summarized below.
Composition of Active Material: $SiO_2$
Angle θ Formed Between Column-like particles and Normal Direction of Current Collector: 45°
Thickness t of Active Material Layer: 11 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

Charge and discharge efficiency, high-rate ratio, and capacity retention rate of the Batteries 5A to 5G were measured in the same manner as the above. The results are shown in Table 5.

TABLE 5

| | Charge and Discharge Efficiency (%) | High-rate Ratio (%) | Capacity Retention Rate (%) |
|---|---|---|---|
| Battery 5A | 98 | 89 | 72 |
| Battery 5B | 98 | 90 | 77 |
| Battery 5C | 98 | 90 | 80 |
| Battery 5D | 98 | 90 | 86 |
| Battery 5E | 98 | 90 | 90 |
| Battery 5F | 98 | 90 | 93 |
| Battery 5G | — | — | — |

The battery 5G had no capacity at the charge and discharge test, and no test could be carried out. The results of the batteries 5A to 5F revealed that the higher ratio of oxygen included in the negative electrode active material improves capacity retention rate. This is probably because the low ratio of oxygen included in the electrode active material increases the expansion rate of the active material at the time of charging. On the other hand, when the ratio of oxygen included in the negative electrode active material is high, the expansion rate of active material at the time of charging becomes low, thereby securing sufficient gaps between the columnar particles, easing the stress, and securing the current collecting ability. Therefore, when the ratio of oxygen included in the negative electrode active material is small, by glowing the active material under the conditions that increases porosity P, an excellent negative electrode which does not easily receive stress due to the expansion of the active material can be obtained.

Example 6

Negative electrodes 6A to 6B below were made by using a silicon alloy as a negative electrode active material, and Test Batteries 6A to 6B were made in the same manner as Example 1, except that the negative electrodes 6A to 6B were used. For the metal element M to be included in the silicon alloy in addition to silicon, Ti or Cu which does not form an alloy with lithium was used.
<i> Negative Electrode 6A A negative electrode 6A was made in the same manner as Example 1, except that a mixture of Si powder and $TiSi_2$ powder ($Si:TiSi_2=3:1$(mole ratio)) manufactured by Kojundo Chemical Lab. Co. Ltd. was used as a target 35, and the flow rate of the oxygen was set to 0 sccm, at the time of forming the negative electrode active material. As the obtained active material layer was quantitated by an X-ray fluorescence spectrometric analysis, it was found that the composition of the alloy was $SiTi_{0.2}$.

Properties of the negative electrode 6A are summarized below.
Composition of Active Material: $SiTi_{0.2}$
Angle θ Formed Between Column-like particles and Normal Direction of Current Collector: 45°
Thickness t of Active Material Layer: 9 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%
<ii> Negative Electrode 6B A negative electrode 6B was made in the same manner as Example 1, except that a mixture of Si powder and Cu powder ($Si:Cu=5:1$(mole ratio)) manufactured by Kojundo Chemical Lab. Co. Ltd. was used as a target 35, and the flow rate of the oxygen was set to 0 sccm, at the time of forming the negative electrode active material. As the obtained active material layer was quantitated by an X-ray fluorescence spectrometric analysis, it was found that the composition of the alloy was $SiCu_{0.2}$.

Properties of the negative electrode 6B are summarized below.
Composition of Active Material: $SiCu_{0.2}$
Angle θ Formed Between Column-like particles and Normal Direction of Current Collector: 45°
Thickness t of Active Material Layer: 9 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

Charge and discharge efficiency, high-rate ratio, and capacity retention rate of the Batteries 6A to 6B were measured in the same manner as the above. The results are shown in Table 6.

TABLE 6

|  | Charge and Discharge Efficiency (%) | High-rate Ratio (%) | Capacity Retention Rate (%) |
|---|---|---|---|
| Battery 6A | 98 | 89 | 72 |
| Battery 6B | 98 | 86 | 71 |
| Battery 7A | 98 | 90 | 86 |
| Battery 7B | 98 | 89 | 89 |

Example 7

Negative electrodes 7A to 7B below were made by using a compound including silicon and nitrogen as a negative electrode active material, and Test Batteries 7A to 7B were made in the same manner as Example 1, except that the negative electrodes 7A to 7B were used.

<i> Negative Electrode 7A

A negative electrode 7A was made in the same manner as Example 1, except that a silicon monocrystalline manufactured by Kojundo Chemical Lab. Co. Ltd. was used as a target 35, nitrogen was introduced to the vacuum chamber instead of oxygen, the accelerating voltage and the emission of the electron beam applied to the target 35 was set to −8 kV and 300 mA, respectively, and the vapor-deposition period was set to 40 minutes, at the time of forming the negative electrode active material.

For the nitrogen gas, the nitrogen gas with 99.7% purity (manufactured by Nippon Sanso Corporation) was used, and the flow rate of the nitrogen was set to 20 sccm. In the vicinity of a nozzle 32, EB applying apparatus was placed, and the nitrogen gas was plasmatized by setting the accelerating voltage to −4 kV and the emission to 20 mA.

As the obtained active material layer was quantitated by an X-ray fluorescence spectrometric analysis, it was found that the composition of compound including silicon and nitrogen was $SiN_{0.2}$.

Properties of the negative electrode 7A are summarized below.
Composition of Active Material: $SiN_{0.2}$
Angle θ Formed Between Column-like particles and Normal Direction of Current Collector: 45°
Thickness t of Active Material Layer: 9 μm
Center-to-center Distance of Column-like Particles Adjacent to Each Other: 7 μm
Diameter of Column-like Particles: 5 μm
Surface Roughness Rz: 10 μm
Exposure Ratio S of the Current Collector: 0%
Porosity P: 30%

<ii> Negative Electrode 7B

A negative electrode 7B was made in the same manner as Example 1, except that a silicon monocrystalline manufactured by Kojundo Chemical Lab. Co. Ltd. was used as a target 35, nitrogen was introduced to the vacuum chamber together with oxygen, the accelerating voltage and the emission of the electron beam applied to the target 35 was set to −8 kV and 300 mA, respectively, and the vapor-deposition period was set to 40 minutes, at the time of forming the negative electrode active material.

For the oxygen gas, the oxygen gas with 99.7% purity (manufactured by Nippon Sanso Corporation) was used. For the nitrogen gas, the nitrogen gas with 99.7% purity (manufactured by Nippon Sanso Corporation) was used. The flow rate of the oxygen gas and the nitrogen gas was set to 10 sccm, respectively. In the vicinity of a nozzle 32, EB applying apparatus was placed, and the nitrogen gas was plasmatized by setting the accelerating voltage to −4 kV and the emission to 20 mA.

As the obtained active material layer was quantitated by an X-ray fluorescence spectrometric analysis, it was found that the composition of a compound including silicon and nitrogen was $SiO_{0.1}N_{0.1}$.

Properties of the negative electrode 7B are summarized below.
Composition of Active Material: $SiO_{0.1}N_{0.1}$
Angle θ Formed Between Column-like particles and Normal Direction of Current Collector: 45°
Thickness t of Active Material Layer: 9 μm
Center-to-center Distance of Column-like Particles Adjacent to Each Other: 7 μm
diameter of columnar particles: 5 μm
Surface Roughness Rz: 10 μm
Exposure Ratio S of The Current Collector: 0%
Porosity P: 30%

Charge and discharge efficiency, high-rate ratio, and capacity retention rate of the Batteries 7A to 7B were measured in the same manner as the above. The results are shown in Table 6.

The results of the battery 6A revealed that the effects of the present invention can be obtained also when the alloy including silicon and titanium was used for an active material. Also, the results of the battery 6B revealed that the effects of the present invention can be obtained also when the alloy including silicon and copper was used as an active material.

The results of the battery 7A revealed that the effects of the present invention can be obtained also when the compound including silicon and nitrogen was used for an active material. Also, from the results of the battery 7B, it was revealed that the effects of the present invention can be obtained also when the compound including silicon, nitrogen, and oxygen was used for an active material.

The present invention can be applied to a lithium secondary battery in various forms, and is especially useful in a lithium secondary battery in which a high capacity and excellent cycle characteristics are demanded. The forms of the lithium secondary battery to which the present invention is applied are not particularly limited. Coin-shape, button-shape, sheet-shape, cylindrical-shape, flat-shape, or rectangular-shape can be mentioned, for example. Additionally, a form of an electrode plate assembly comprising a positive electrode, a negative electrode, and a separator can be wound-type or laminated-type. The size of a battery can be small, for a mobile device, or large, for an electromotive car. A lithium secondary battery of the present invention can be used for a power source of a portable digital assistance, mobile electronic device, a household small power storage facility, motorcycle, electromotive car, and hybrid electromotive car, for example, but not limited to thereto.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium secondary battery, including a current collector and an active material layer carried on said current collector,
   said active material layer comprising a plurality of columnar particles,
   said columnar particles comprising an element of silicon, and
   said columnar particles being tilted from a direction perpendicular to a main flat surface of said current collector,
   wherein all of said plurality of columnar particles are arranged with a substantially uniform pitch, and
   wherein a porosity P of said active material layer is 10% to 70%.

2. The negative electrode for a lithium secondary battery in accordance with claim 1, wherein an angle θ formed between said columnar particles and said normal direction of said current collector is 10° or more and less than 90°.

3. The negative electrode for a lithium secondary battery in accordance with claim 1, wherein an area A of a portion in said current collector where said active material layer is carried, and an area B of an orthographic projection of said active material layer seen from said normal direction satisfy the relation:

$$\frac{A-B}{A} \times 100 \le 60.$$

4. The negative electrode for a lithium secondary battery in accordance with claim 1, wherein said active material layer comprises at least one selected from the group consisting of a simple substance of silicon, a silicon alloy, a compound including silicon and oxygen, and a compound including silicon and nitrogen.

5. The negative electrode for a lithium secondary battery in accordance with claim 4, wherein said silicon alloy is an alloy including silicon and a metal element M, and said metal element M does not form an alloy with lithium.

6. The negative electrode for a lithium secondary battery in accordance with claim 5, wherein said metal element M is at least one selected from the group consisting of titanium, copper, and nickel.

7. The negative electrode for a lithium secondary battery in accordance with claim 4, wherein said compound including silicon and oxygen comprises a composition represented by the general formula (I): $SiO_x$, where $0<x<2$.

8. A lithium ion secondary battery, comprising:
   a positive electrode capable of absorbing and desorbing lithium ion,
   the negative electrode in accordance with claim 1,
   a separator disposed between said positive electrode and said negative electrode, and
   an electrolyte having lithium ion conductivity.

9. The negative electrode for a lithium secondary battery in accordance with claim 1, wherein said porosity is 30% to 60%.

10. The negative electrode for a lithium secondary battery in accordance with claim 1, wherein each of the columnar particles has a different and separate starting point of growth.

11. The negative electrode for a lithium secondary battery in accordance with claim 1, wherein the pitch is about 0.1 μm to about 200 μm.

12. The negative electrode for a lithium secondary battery in accordance with claim 1, wherein said plurality of columnar particles are arranged in a substantially uniform direction with a substantially uniform angle of tilt.

13. The negative electrode for a lithium secondary battery in accordance with claim 1, wherein said plurality of columnar particles have substantially straight sides along a direction extending from the current collector to an external surface of said electrode.

* * * * *